Patented Mar. 3, 1953

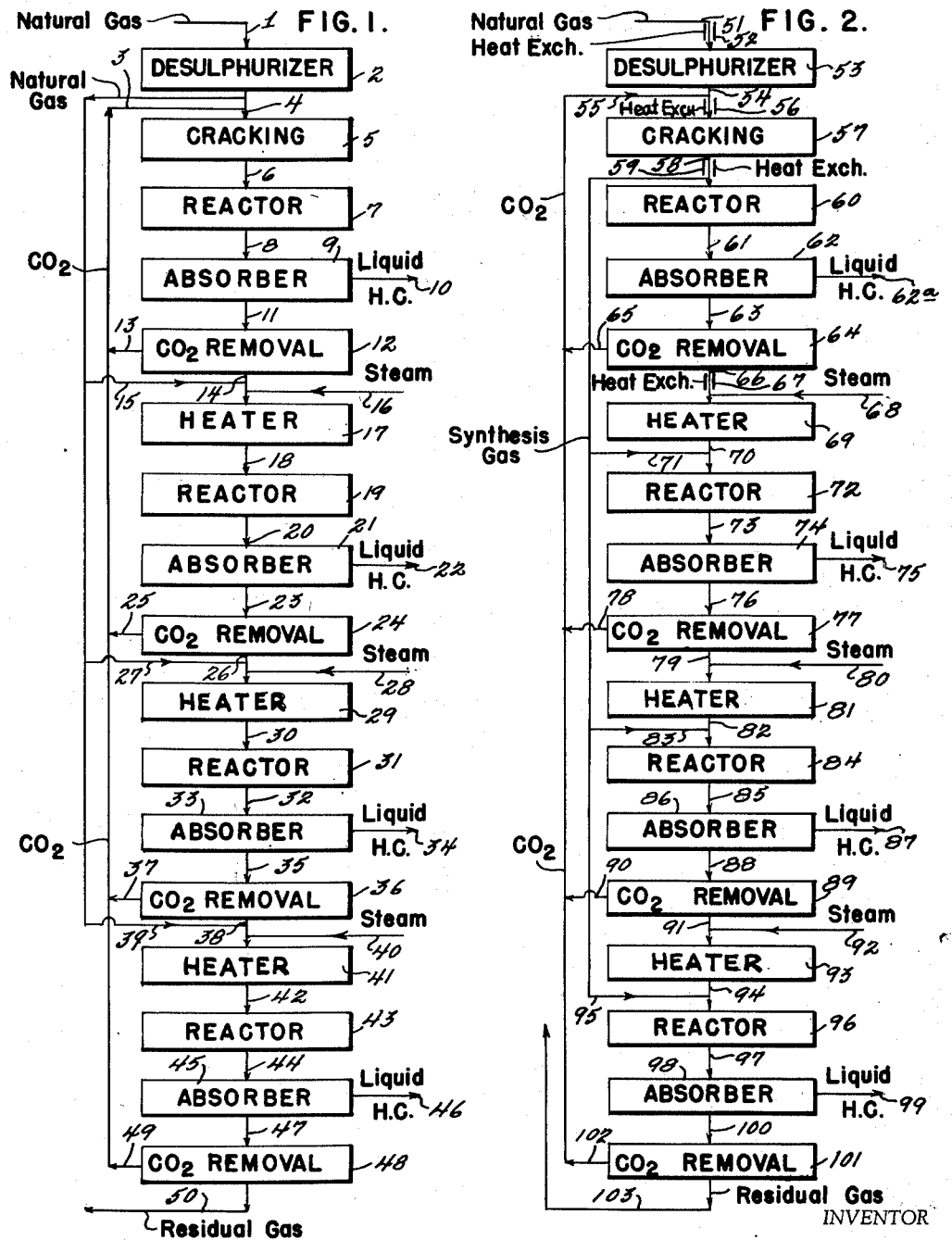

2,630,447

UNITED STATES PATENT OFFICE 2,630,447

PROCESS FOR THE SYNTHETIC MANUFACTURE OF HYDROCARBON OILS

Michael Steinschlaeger, London, England

Application July 15, 1947, Serial No. 761,022
In Great Britain September 3, 1942

2 Claims. (Cl. 260—449.6)

This invention relates to a process for the manufacture of hydrocarbon oils and is particularly concerned with the production of products rich in olefines.

Primary products obtained by the Fischer-Tropsch or like processes from gases containing CO and $H_2$ in ratios varying between 1:1.5 and 2:1 by volume are rich in valuable olefines. On the other hand, in order to avoid the formation and deposition of carbon on the catalyst and so to destroy or damage the activity of the same, it is necessary to maintain the operating conditions such that the yield of primary products rich in olefines per cubic metre of gas used in comparison with the yields obtained in the synthesis processes using gases having a ratio of CO : $H_2$=1:2 by volume is low. Consequently a high consumption of fuels, high cost of production and high capital expenditure for the plant are involved.

The following suggestions have been made to overcome these drawbacks:

(a) Re-cycle the residual gases and vent a part of the residual gas so as to avoid a too high concentration of inerts such as carbon dioxide, nitrogen and methane;

(b) Separate the inerts from the residual gases before mixing them with the original gas by removing carbon dioxide by absorption, nitrogen by liquefaction (very high cost of: 1, the operation; 2, the plant; 3, the power consumption); and by converting methane to carbon monoxide and hydrogen;

(c) It has been further suggested to use oxygen in the production of synthesis gas but as will be shown hereinafter the cost of the oxygen production and the cost of the plant for production of oxygen increase considerably the cost per unit of primary products obtained.

The disadvantages of the prior proposals are dealt with in detail hereinafter.

An object of the present invention is to overcome these drawbacks and in addition to provide the considerable amount of sulphur free carbon dioxide required to produce carbon monoxide-rich gases for example from natural gas according to the reaction $CH_4+CO_2=2CO+2H_2$.

It has been suggested to obtain the carbon dioxide by the burning of residual gases (which is wasteful; it is better to convert the residual gases into primary products as far as possible) and washing out the carbon dioxide. If other sources of carbon dioxide are used such as combustion gases from natural gas not freed from organic and inorganic sulphur it is necessary to purify the carbon dioxide obtained from the above impurities.

To obtain primary products rich in olefines usually cobalt or iron-containing catalysts are used and the reactions involved in the synthesis are as follows:

A. Cobalt catalyst:

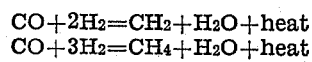
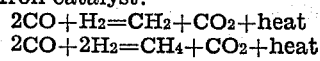

B. Iron catalyst:
2CO+$H_2$=$CH_2$+$CO_2$+heat
2CO+2$H_2$=$CH_4$+$CO_2$+heat

Using an iron catalyst it is possible also to obtain a part of the products as in the cobalt reaction and consequently it is possible to regulate the amount of carbon dioxide (and the composition of the residual gases obtained in respect of carbon monoxide and hydrogen content) obtained according to the requirements in the process.

The present invention provides a process of producing normally liquid hydrocarbons rich in olefines by synthesis of carbon monoxide and hydrogen which comprises, in an initial synthesis gas-forming step, reacting fixed hydrocarbon gases (previously freed from sulphur and other undesirable impurities) with carbon dioxide of the residue gas produced in the synthesis reaction to form a carbon monoxide-hydrogen mixture (synthesis gas I) containing CO and $H_2$ in a ratio varying from between 1:1.5 and 2:1 by volume. The synthesis gas-forming reaction may be brought about by the use of any suitable reforming catalyst and heating to a suitable temperature. For example, the mixture of fixed hydrocarbon gases and carbon dioxide may be heated at 1000° C. in the presence of a nickel catalyst. The resulting synthesis gas mixture is then caused to undergo a hydrocarbon synthesis in the presence of a catalyst selected from the group consisting of cobalt, nickel and iron at a temperature of between 150° and 400° C. in a first reaction zone to produce primary products rich in olefines and a residual gas (residual gas I). The liquefiable hydrocarbons rich in olefines are then separated from the residual reaction gases. At least a large part of the carbon dioxide present in the residual gas is also separated and recycled to the initial synthesis gas-forming stage. The remainder of the residual gases is then mixed with gases rich in gaseous hydrocarbons and with steam in proportions adjusted to insure on subsequent reforming a synthesis gas containing CO and $H_2$ in proportions within the range previously stated. The resulting mixture is then subjected to a catalytic reforming as by heating at a temperature between 800° and 1500° C. in the presence of a nickel catalyst thereby producing a second synthesis gas mixture (synthesis gas II). This second synthesis gas mixture is then caused to undergo a hydrocarbon synthesis at a temperature within the range and in the presence of a catalyst of the group specified for the first stage synthesis. The liquefiable olefine-rich hydrocarbons formed in the second synthesis step are then separated as before, and likewise at least a large part of the carbon dioxide is separated and recycled to the initial synthesis gas-forming step. The successive steps of catalytic reforming of the residual gases from each preceding synthesis step with fixed hydrocarbon gases and steam added in proportions to insure formation of fresh increments of synthesis gas containing carbon monoxide and hydrogen in the controlled proportions previously stated and the synthesizing of the resulting synthesis gas to form olefine-rich mixtures, followed by separation of the liquefiable hydrocarbons, removal and recycling of at least part of the carbon dioxide, and addition of fresh increments of hydrocarbon gases and of steam for the successive catalytic reforming stages, are all repeated in sequence until the inert content of the residual reaction gases has built up to the point where the yield of liquid hydrocarbons rich in olefines has been substantially lowered so as to make for an uneconomic operation. The final residual gases may then be used as low grade fuel for supplying heat needed at certain stages of the process or for other heating purposes.

Examples of hydrocarbon-containing gases which may be used are natural gas and coke oven gas.

The composition of the synthesis gases I, II, etc., can be varied according to the primary products which are required and according to the catalysts used.

Some embodiments of the process of the invention and the advantages thereof using natural gas as the hydrocarbon-containing gas will now be further described in the following examples (in which the percentages are by volume), and with the aid of the accompanying drawings, in which:

Fig. 1 is a flow sheet showing the manufacture of valuable products according to the invention starting from natural gas, and Fig. 2 is a flow sheet showing a modified form of the process illustrated in Fig. 1.

In the drawings valves and other controls are omitted for the sake of clarity.

EXAMPLE 1

Referring to Fig. 1 of the drawings, natural gas having a composition $CH_4=90.0\%$, $C_2H_6=8.0\%$, and $CO_2+N_2=2.0\%$ was admitted through line 1 into a conventional desulphurising apparatus 2 and 250,000 cubic metres of the purified natural gas obtained was mixed with 300,000 cubic metres of carbon dioxide admitted through line 3, and the mixture passed through line 4 into cracking apparatus 5 where it was cracked at 1000° C. in the presence of a nickel cracking catalyst to produce a synthesis gas I having the composition $CO=46.0\%$, $H_2=51.0\%$ and $CH_4+N_2+CO_2=3.0\%$.

1,000,000 cubic metres of the synthesis gas I was passed through line 6 and subjected to a hydrocarbon synthesis treatment at 180° C. in vessel 7 which contained a cobalt catalyst.

The products obtained were passed via line 8 into a condensation and absorption plant 9 where 92 metric tons of liquid hydrocarbons and $C_3$ and $C_4$ hydrocarbons rich in olefines were condensed and removed through line 10. The gaseous products were then passed via line 11 to a conventional carbon dioxide removal plant 12 where the carbon dioxide was removed and re-cycled via line 13 to line 3. The residual gas I which was removed via line 14 amountd to 500,000 cubic metres having a composition of $CO=56.0\%$, $H_2=32.0\%$, $CH_4+N_2=12.0\%$, and was mixed with 50,000 cubic metres of natural gas of the composition given above, admitted through line 15.

After addition of 120,000 kgs. of steam admitted through line 16 the mixture was heated in heater 17 at 1000° C. in the presence of a nickel catalyst and the treated gas, amounting to 810,000 cubic metres (synthesis gas II) had the following composition: $CO=45.5\%$, $H_2=51.5\%$, and $CH_4+N_2+CO_2=3.0\%$. The synthesis gas II was then passed by line 18 to vessel 19 which contained a cobalt catalyst and wherein the temperature was maintained at 180° C. The products were passed via line 20 into the condensation and absorption plant 21 where 75 metric tons of liquid hydrocarbons and $C_3$ and $C_4$ hydrocarbons rich in olefines were condensed and removed through line 22. The gaseous products were then passed via line 23 to a conventional carbon dioxide removal plant 24 where carbon dioxide was removed and re-cycled via line 25 to line 3. The residual gas II obtained after removal of the carbon dioxide amounted to 405,000 cubic metres and had the following composition: $CO=56.0\%$, $H_2=32.0\%$, and $CH_4+N_2=12.0\%$. This residual gas II was withdrawn through line 26 and mixed with 45,000 cubic metres of natural gas of the composition given above, admitted through line 27.

After addition of 110,000 kgm. of steam admitted through line 28, the mixture was heated in heater 29 at 1000° C. in the presence of a nickel catalyst and the treated gas amounting to 670,000 cubic metres (synthesis gas III) had the following composition: $CO=44.8\%$, $H_2=51.8\%$, and $CH_4+N_2+CO_2=3.4\%$. The synthesis gas III was then passed via line 30 to vessel 31 which contained a cobalt catalyst and was subjected to a hydrocarbon synthesis treatment therein at 180° C. The products were passed via line 32 into the condensation and absorption plant 33 where 62 metric tons of liquid hydrocarbons and $C_3$ and $C_4$ hydrocarbons rich in olefines were condensed and removed through line 34. The gaseous products were then passed via line 35 to a conventional carbon dioxide removal plant 36 where carbon dioxide was removed and re-cycled via line 37 to line 3. The residual gas III obtained after removal of the carbon dioxide amounted to 335,000 cubic metres and had the following composition: $CO=54.0\%$, $H_2=32.0\%$ and $CH_4+N_2=14.0\%$. The residual gas III was now withdrawn through line 38 and mixed with 30,000 cubic metres of natural gas of the composition given above admitted through line 39.

After addition of 80,000 kgs. of steam admitted through line 40 the mixture was heated in heater 41 at 1000° C. in the presence of a nickel catalyst and the treated gas amounting to 510,000 cubic metres (synthesis gas IV) had the following composition: CO=45.0%, H$_2$=51.0% and CH$_4$+N$_2$+CO$_2$=4.0%. The synthesis gas IV was then passed via line 42 to vessel 43 which contained a cobalt catalyst and was subjected to a hydrocarbon synthesis treatment therein at 180° C. The products were passed via line 44 into the condensation and absorption plant 45 where 47 metric tons of liquid hydrocarbons and C$_3$ and C$_4$ hydrocarbons rich in olefines were condensed and removed through line 46. The gaseous products were then passed via line 47 to a conventional carbon dioxide removal plant 48 where carbon dioxide was removed and re-cycled via line 49 to line 3. The residual gas IV was removed via line 50 and used for heating in the plant.

If desired, the gas leaving vessel 33 may be reacted with steam to increase the proportion of hydrogen before being passed to the plant 36 for the removal of carbon dioxide.

The results obtained are summarised in the following Tables I and II.

cubic metres of this purified natural gas leaving the purifier through line 54 was mixed with 274,000 cubic metres of carbon dioxide admitted through line 55 and the mixture passed through heat exchanger 56 into the cracking apparatus 57, where it was cracked at 850° C. in the presence of a nickel cracking catalyst to produce 1,000,000 cubic metres of a synthesis gas I having the composition CO=52.0%, H$_2$=43.2%, CO$_2$=1.8%, N$_2$=1.6% and CH$_4$=1.4%, which was passed through line 58 and through heat exchanger 59 to vessel 60 in which it was subjected to a hydrocarbon synthesis treatment at 250° C. The vessel 60 contained an iron catalyst. The products obtained were passed via line 61 into a condensation and absorption plant 62 where 92 metric tons of liquid hydrocarbons and C$_3$ and C$_4$ hydrocarbons rich in olefines were condensed and removed via lines 62a. The gaseous products (583,000 cubic metres) were then passed via line 63 to a conventional carbon dioxide removal plant 64 where the carbon dioxide was removed and re-cycled via line 65 to line 55. The residual gas I which was removed via line 66 amounted to 488,000 cubic metres and had the following composition: CO=55.2%, H$_2$=33.1%, CH$_4$=7.0%, N$_2$=3.3%, CO$_2$=1.4%. The residual gas I was

*Table I*

| Synthesis Gas No. | 1 | 2 | 3 | 4 |
|---|---|---|---|---|
| 1. Production of Synthesis Gas from | Natural gas treated with CO$_2$ in the presence of a catalyst at 1000° C. | Residual gas I—natural gas with steam in the presence of a catalyst at 1000° C. | Residual Gas II—natural gas with steam in the presence of a catalyst at 1000° C. | Residual Gas III—natural gas with steam in the presence of a catalyst at 1000° C. |
| 2. Synthesis Gas, cubic metres | 1,000,000 | 810,000 | 670,000 | 510,000. |
| 3. Used Residual Gas, cubic metres | | 500,000 | 405,000 | 335,000. |
| 4. Used natural gas | 250,000 | 50,000 | 45,000 | 30,000. |
| 5. Composition of Synthesis Gas CO+H$_2$%. | 46+51 | 45.5+51.5 | 44.8+51.8 | 45+51. |
| 6. Composition of Residual Gas CO+H$_2$%. | | 56+32 | 56+32 | 54+32. |
| 7. Yields of primary products rich in olefines (metric tons) | 92 | 75 | 62 | 47. |

*Table II*

| Synthesis Gas No. | Cubic metres | Inerts CH$_4$+N$_2$+CO$_2$ | | Natural gas used, cubic metres | Residual Gas, cubic metres | Primary products obtained, tons |
|---|---|---|---|---|---|---|
| | | Percent | Cubic metres | | | |
| I | 1,000,000 | 3.0 | 30,000 | 250,000 | 500,000 | 92 |
| II | 810,000 | 3.0 | 24,300 | 50,000 | 405,000 | 75 |
| III | 670,000 | 3.4 | 22,700 | 45,000 | 335,000 | 62 |
| IV | 510,000 | 4.0 | 20,400 | 30,000 | 255,000 | 47 |
| | [1] 2,990,000 | | 97,400 | 375,000 | | 276 |

[1] I. e. approximately 3,000,000.

Consumption of natural gas per kg. of primary products:
1. For synthesis gas production, 1.36 cubic metres.
2. For heating purposes, 0.64 cubic metre.
Total consumption per kg. of primary products rich in olefines, 2.0 cubic metres.

EXAMPLE 2

Referring now to Fig. 2 of the drawings, natural gas having a composition CH$_4$=70.0%, C$_2$H$_6$=7.0%, C$_3$H$_8$=10.0%, C$_4$H$_{10}$=5.0% and N$_2$=8.0% and a net calorific value of 10,800 cals. per cubic metre was introduced through line 51 into heat exchanger 52 and thence into a conventional desulphurising apparatus 53. 204,000 now passed through heat exchanger 67, 40,000 kgs. of steam were admitted through line 68 and the mixture was heated to 1000° C. in the presence of a nickel catalyst in heater 69 to produce 580,000 cubic metres of gas which was withdrawn through line 70. The gas had the following composition: CO=51.8%, H$_2$=43.7%, CH$_4$=0.6%, N$_2$=2.7% and CO$_2$=1.2%.

A further 420,000 cubic metres of synthesis gas I made from 86,000 cubic metres of the natural gas referred to above was mixed with the 580,000 cubic metres of gas by introduction through line 71 to form synthesis gas II and synthesis gas II was now subjected to a hydrocarbon synthesis treatment at 250° C. in vessel 72 which contained an iron catalyst. The products obtained were passed via line 73 into a condensation and absorption plant 74 where 92 metric tons of liquid hydrocarbons and $C_3$ and $C_4$ hydrocarbons rich in olefines were condensed and removed through line 75. The gaseous products (583,000 cubic metres) were then passed through line 76 to a conventional carbon dioxide removal plant 77 where the carbon dioxide was removed and re-cycled via line 78 to line 55. The residual gas II, which was removed via line 79, amounted to 493,000 cubic metres and had the following composition: $CO=54.4\%$, $H_2=33.8\%$, $CH_4=5.9\%$, $N_2=4.7\%$, and $CO_2=1.2\%$. The residual gas II was now mixed with 35,000 kgs. of steam admitted through line 80 and the mixture heated in heater 81 at 1000° C. in the presence of a nickel catalyst to produce 570,000 cubic metres of gas which was withdrawn through line 82. The gas obtained had the composition: $CO=51.5\%$, $H_2=43.2\%$, $CO_2=1.3\%$, $N_2=3.3\%$ and $CH_4=0.7\%$.

A further 230,000 cubic metres of synthesis gas I made from 47,000 cubic metres of the natural gas referred to above was mixed with the gas by introduction through line 83 to produce synthesis gas III. Synthesis gas III was now subjected to a hydrocarbon synthesis treatment at 250° C. in vessel 84 which contained an iron catalyst. The products obtained were passed via line 85 into a condensation and absorption plant 86 where 74 metric tons of liquid hydrocarbons and $C_3$ and $C_4$ hydrocarbons rich in olefines were condensed and removed through line 87. The gaseous products (460,000 cubic metres) were then passed through line 88 to a conventional carbon dioxide removal plant 89 where the carbon dioxide was removed and re-cycled via line 90 to line 55. The residual gas III which was removed via line 91 amounted to 393,000 cubic metres and had the following composition: $CO=53.8\%$, $H_2=32.8\%$, $CH_4=5.5\%$, $N_2=6.7\%$ and $CO_2=1.2\%$. The residual gas III was now mixed with 26,000 kgs. of steam admitted through line 92 and the mixture heated in heater 93 at 1000° C. in the presence of a nickel catalyst to produce 450,000 cubic metres of gas which had the following composition: $CO=51.2\%$, $H_2=42.0\%$, $CO_2=1.1\%$, $N_2=5.3\%$ and $CH_4=0.5\%$. The gas was withdrawn through line 94 and mixed with a further 50,000 cubic metres of synthesis gas I made from 10,000 cubic metres of the natural gas referred to above, the said synthesis gas I being admitted through line 95, to form synthesis gas IV. The synthesis gas IV was now subjected to a hydrocarbon synthesis treatment at 250° C. in vessel 96 which contained an iron catalyst. The products obtained were passed via line 97 into a condensation and absorption plant 98 where 46 metric tons of liquid hydrocarbons and $C_3$ and $C_4$ hydrocarbons rich in olefines were condensed and removed through line 99. The gaseous products were then passed through line 100 to a conventional carbon dioxide removal plant 101 where the carbon dioxide was removed and re-cycled via line 102 to line 55. The residual gas IV (250,000 cubic metres) having the composition $CO=53.0\%$, $H_2=30.0\%$, $CH_4=5.1\%$, $N_2=10.7\%$ and $CO_2=1.2\%$ was removed via line 103 and used for heating in the system.

In this example the reactions with carbon dioxide which take place may be expressed as follows:

(a) $CH_4+CO_2=2CO+2H_2-2630$ cals. per cubic metre of $CH_4$.
(b) $C_2H_6+2CO_2=4CO+3H_2-4420$ cals. per cubic metre of $C_2H_6$.
(c) $C_3H_8+3CO_2=6CO+4H_2-6050$ cals. per cubic metre of $C_3H_8$.
(d) $C_4H_{10}+4CO_2=8CO+5H_2-7500$ cals. per cubic metre of $C_4H_{10}$.

The average reaction heat required (assuming 90% conversion of $CH_4$ into CO and $H_2$) per cubic metre of the natural gas employed amounts to 2940 cals.

Per cubic metre of natural gas 4.90 cubic metres of synthesis gas I of the following average composition have been obtained:

|  | CO | $H_2$ | $CH_4$ | $N_2$ | $CO_2$ |
|---|---|---|---|---|---|
| Percent | 52.0 | 43.2 | 1.4 | 1.6 | 1.8 |

The total heat required to convert 1 cubic metre of natural gas into 4.9 cubic metres of synthesis gas I amounts to: (Assuming that the natural gas is heated in the presence of a catalyst to 850° C. and the natural gas and carbon dioxide are pre-heated to 500° C.)—3390 cals. per cubic metre.

Furthermore, assuming that the mixture of natural gas and carbon dioxide is heated in regenerators or stoves which have been heated by a previous operation by using pre-heated gases and air for combustion.

Taking the efficiency of the plant at 85%, the amount of heat required to produce 4.9 cubic metres of synthesis gas I will be $$\frac{3390}{0.85}=4000 \text{ cals.}$$

or equivalent to 0.37 cubic metre of natural gas. The amount of carbon dioxide required per cubic metre of natural gas is 1.3 cubic metres.

In the above example an iron catalyst was used and the average yield per cubic metre of synthesis gas is chosen low (so as to avoid the formation and deposition of carbon on the catalyst)—92 gms. per cubic metre (liquid hydrocarbons and $C_3$ and $C_4$ hydrocarbons rich in olefines).

Reactions using iron catalysts:

$(2CO+H_2)_x=(CO_2+CH_2)_x$
$\qquad 2CO+2H_2=CH_4+CO_2 \quad (1)$ $(CO+2H_2)_x=(H_2O+CH_2)_x$
$\qquad CO+3H_2=CH_4+H_2O \quad (2)$ The reaction in the example:
For production of—

$CH_2 \quad 1.5CO+1.5H_2=$
$\qquad 0.5CO_2+\frac{1}{2}H_2O+CH_2 \quad (1a)$
$CH_4 \quad 1.5CO+2.5H_2=CH_4+\frac{1}{2}CO_2+\frac{1}{2}H_2O \quad (2a)$ As a considerable amount of carbon dioxide is required in the process the reaction in the example may be varied so as to vary the amount of carbon dioxide obtained in the process.

The results are summarized in Tables III and IV.

hydrocarbons and with steam in proportions adjusted to insure on subsequent reforming a syn-

*Table III*

|  | 1 | 2 | 3 | 4 |
|---|---|---|---|---|
| 1. Production of Synthesis gas from | Natural gas treated with $CO_2$ in presence of catalyst at 850° C.—Synthesis Gas I. | Residual Gas I treated with steam in presence of catalyst at 850° C.—Synthesis Gas I, Synthesis Gas II. | Residual Gas II treated with steam in presence of catalyst at 850° C.—Synthesis Gas I, Synthesis Gas III. | Residual Gas III treated with steam at elevated temp.—Synthesis Gas I, Synthesis Gas IV. |
| 2. Synthesis Gas, cubic metres | 1,000,000 | 1,000,000 | 800,000 | 500,000. |
| 3. Residual Gas used: |  |  |  |  |
| (a) Residual Gas+$CO_2$ formed, cubic metres. |  | 583,000 | 583,000 | 460,000. |
| (b) After removal of $CO_2$, cubic metres. |  | 488,000 | 493,000 | 393,000. |
| (c) After treatment with steam at elevated temperature. |  | 580,000 | 570,000 | 450,000. |
| 4. Synthesis Gas I used, cubic metres | 1,000,000 | 420,000 | 230,000 | 50,000. |
| Or equivalent of Natural Gas, cubic metres. | 204,000 | 86,000 | 47,000 | 10,000. |
| 5. Composition of Synthesis Gas, $CO+H_2$, percent. | 52.0+43.2=95.2 | 51.8+43.7=95.5 | 51.5+43.2=94.7 | 51.2+42.0=93.2. |
| 6. Composition of Residual Gas after removal of $CO_2$: |  |  |  |  |
| $CO+H_2+CH_4+N_2+CO_2$ | 55.2+33.1+7.0+3.3+1.4. | 54.4+33.8+5.9+4.7+1.2. | 53.8+32.8+5.5+6.7+1.2. | 53.0+30.0+5.1+10.7+1.2. |
| 7. Inert contents of the Synthesis Gas: |  |  |  |  |
| $CO_2+N_2+CH_4$, percent | 1.8+1.6+1.4=4.8 | 1.3+2.3+0.9=4.5 | 1.3+3.3+0.7=5.3 | 1.1+5.3+0.5=6.9 (Residual Gas IV 250,000 cubic metres). |
| 8. Yields of primary products rich in olefines, tons. | 92 | 92 | 74 | 46. |
| 9. $CO_2$ production according to the reactions (1) and (2). | 83,000 cubic metres | 83,000 cubic metres | 67,000 cubic metres | 41,000 cubic metres. |
| 10. $CO_2$ removed from Residual Gases, cubic metres. | 95,000 | 90,000 | 60,000 | 40,000. |

Total amount of natural gas used for synthesis and freed from sulphur compounds=347,000 cubic metres;
Primary products=304 tons;
$CO_2$ removed=285,000 cubic metres;

Natural gas used for the synthesis per kgm. of primary products rich in olefines=$\frac{347,000}{304,000}$=1.14 cubic metres (or 5,000 cu. ft. per barrel of oil);

Natural gas used for heating after deducting the heating value of the residual gas=0.34 cubic metre per kgm.;
Total amount of natural gas used per kgm. of primary products rich in olefines=1.48 cubic metres.

*Table IV*

| Synthesis Gas No. | Cubic metres | Inerts | | Cubic metres | | Natural Gas used, cubic metres | Residual Gas, cubic metres, $CO_2$ | $CO_2$ obtained, cubic metres | Primary products, tons |
|---|---|---|---|---|---|---|---|---|---|
|  |  | $CO_2+N_2$ | $CH_4$ | $CO_2+N_2$ | $CH_4$ |  |  |  |  |
| I | 1,000,000 | 3.4 | 1.4 | 34,000 | 14,000 | 204,000 |  | 95,000 | 92 |
| II | 1,000,000 | 3.6 | 0.93 | 36,000 | 9,300 | 86,000 | 448,000 | 90,000 | 92 |
| III | 800,000 | 4.6 | 0.7 | 37,000 | 5,600 | 47,000 | 493,000 | 60,000 | 74 |
| IV | 500,000 | 6.4 | 0.5 | 32,000 | 2,500 | 10,000 | 393,000 | 40,000 | 46 |
|  | 3,300,000 |  |  | 139,000 | 31,400 | 347,000 |  | 285,000 | 304 |

$$CO_2 + N_2 = \frac{139,000 \times 100}{3,300,000} = 4.2\%; \quad CO_2 + N_2 + CH_4 = \frac{170,400 \times 100}{3,300,000} = 5.2\%$$

This application is a continuation-in-part of my application Serial No. 492,949, filed June 30, 1943, now abandoned, and is related to my copending patent application Serial No. 322,603, filed November 26, 1952, which is directed in part to matter disclosed but not claimed herein.

I claim:

1. A process of producing normally liquid hydrocarbons rich in olefines by synthesis of carbon monoxide and hydrogen which comprises, in an initial gas-forming stage, reacting fixed hydrocarbon gases with carbon dioxide of residue gas produced in the process to form a carbon monoxide-hydrogen mixture containing CO and $H_2$ in a ratio varying between 1:1.5 and 2:1 by volume, synthesizing said mixture in the presence of a catalyst selected from the group consisting of cobalt, nickel and iron at a temperature of between 150 and 400° C., separating the liquefiable olefine-rich hydrocarbons from the residual reaction gases, separating at least a large part of the carbon dioxide present in said residual gases and recycling same to the initial synthesis gas-forming stage, mixing the remainder of said residual reaction gases with gases rich in gaseous hydrocarbons and with steam in proportions adjusted to insure on subsequent reforming a synthesis gas containing CO and $H_2$ in proportions within the range previously stated, subjecting the resulting admixture to catalytic reforming to produce a second synthesis gas mixture of the controlled carbon monoxide-hydrogen ratio above stated, and synthesizing said second synthesis gas mixture at a temperature within the range and in the presence of a catalyst of the group specified for the first stage synthesis.

2. A process of producing normally liquid hydrocarbons rich in olefines by synthesis of carbon monoxide and hydrogen which comprises, in an initial gas-forming stage, reacting fixed hydrocarbon gases with carbon dioxide of residue gas produced in the process to form a carbon monoxide-hydrogen mixture containing CO and $H_2$ in a ratio varying between 1:1.5 and 2:1 by volume, synthesizing said mixture in the presence of a catalyst selected from the group consisting of cobalt, nickel and iron at a temperature of between 150 and 400° C., separating the liquefiable olefine-rich hydrocarbons from the residual reaction gases, separating at least a large part of the carbon dioxide present in said residual gases and recycling same to the initial synthesis gas-forming stage, mixing the remainder of said residual reaction gases with gases rich in gaseous hydrocarbons and with steam in proportions adjusted to insure on subsequent reforming a synthesis gas containing CO and $H_2$ in proportions within the range previously stated, subjecting the resulting admixture to catalytic reforming to produce a second synthesis gas mixture of the controlled carbon monoxide-hydrogen ratio above stated, synthesizing said second synthesis gas mixture at a temperature within the range and in the presence of a catalyst of the group specified for the first stage synthesis, then separating the liquefiable olefine-rich hydrocarbons formed in the second synthesis step and thereafter repeating in successive stages the catalytic reforming treatment of the residual gases from each preceding synthesis step with fixed hydrocarbon gases and steam added in proportions adjusted to insure formation of fresh increments of synthesis gas containing carbon monoxide and hydrogen in the controlled proportions previously stated and synthesizing the resulting synthesis gas to form olefine-rich mixtures of liquid hydrocarbons and residual reaction gases, and intermediate each synthesis step and the succeeding reforming step separating the carbon dioxide formed in the synthesis and recycling same to the initial synthesis gas-forming stage of the process, said successive carbon dioxide recycling, synthesis gas reforming and hydrocarbon synthesis steps being repeated until the inert content of the residual reaction gases has built up to the point where the yield of olefine-rich liquid hydrocarbons is substantially lowered.

MICHAEL STEINSCHLAEGER.

REFERENCES CITED

The following references are of record in the file of this patent:

UNITED STATES PATENTS

| Number | Name | Date |
|---|---|---|
| 2,149,515 | Fischer | Mar. 7, 1939 |
| 2,220,357 | Steinschlaeger | Nov. 5, 1940 |
| 2,234,941 | Keith, Jr. | Mar. 11, 1941 |
| 2,286,814 | Kemp | June 16, 1942 |
| 2,274,064 | Howard et al. | Feb. 24, 1942 |
| 2,499,372 | D'Ouville | Mar. 7, 1950 |